Figure 1:
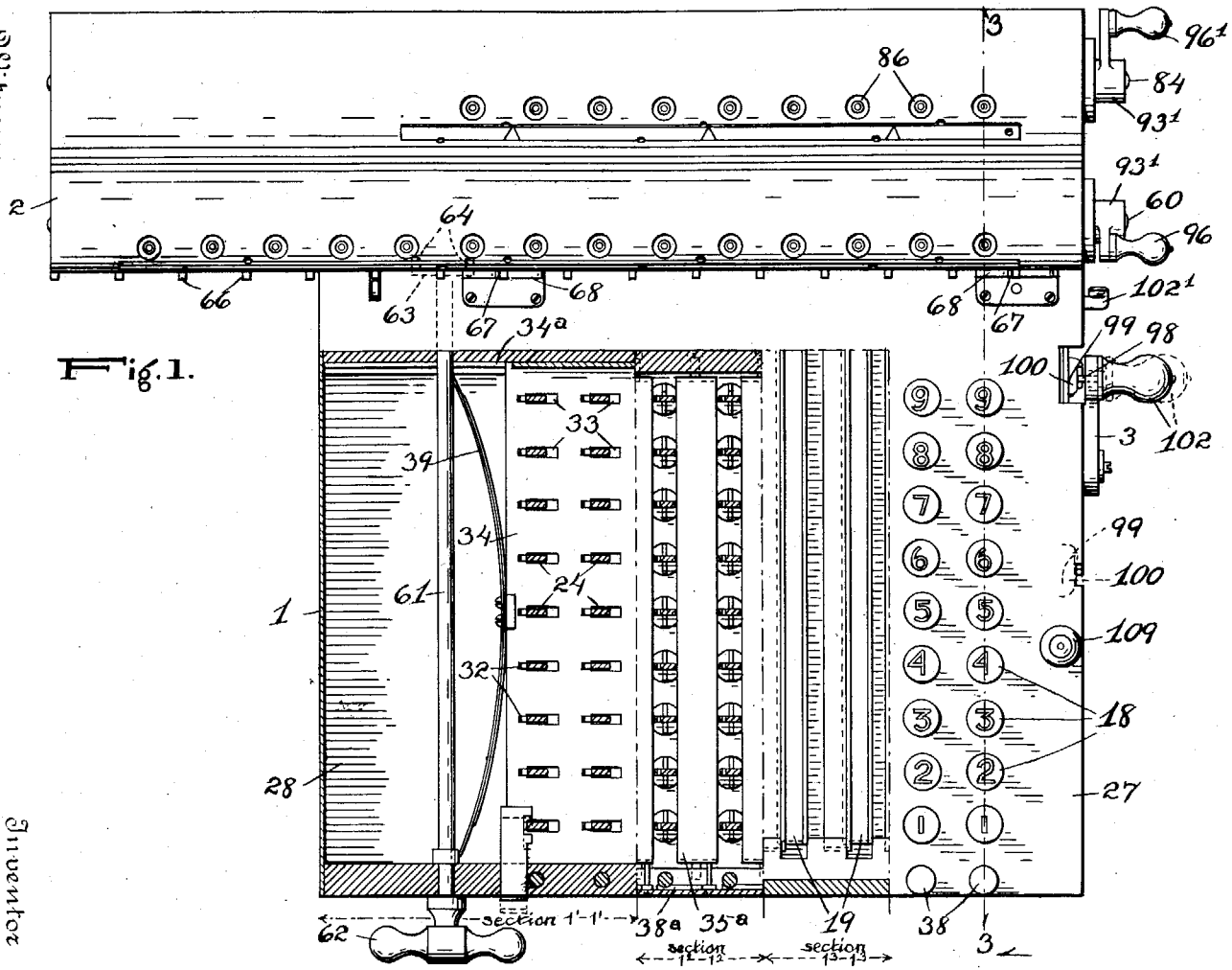

F. S. BALDWIN.

CALCULATING MACHINE.

APPLICATION FILED APR. 20, 1914.

Reissued Dec. 8, 1914.

13,841.

9 SHEETS—SHEET 1.

Witnesses

Stuart Wilder.

Frances W. Anderson

By

Inventor

Frank S. Baldwin

E. W. Anderson & Son his Attorneys

F. S. BALDWIN.

CALCULATING MACHINE.

APPLICATION FILED APR. 20, 1914.

Reissued Dec. 8, 1914.

13,841.

9 SHEETS—SHEET 2.

Witnesses

Stuart Hilder.

Francis W Anderson

Inventor

Frank S. Baldwin

By E. W. Anderson & Son his Attorneys

F. S. BALDWIN.

CALCULATING MACHINE.

APPLICATION FILED APR. 20, 1914.

Reissued Dec. 8, 1914.

13,841.

9 SHEETS—SHEET 3.

Witnesses

Stuart Hilder.

Frances W. Anderson.

Inventor

Frank S. Baldwin

By E. W. Anderson & Son his Attorneys

F. S. BALDWIN.

CALCULATING MACHINE.

APPLICATION FILED APR. 20, 1914.

Reissued Dec. 8, 1914.

13,841.

9 SHEETS—SHEET 4.

Witnesses

Stuart Hilder.

Frances M Anderson.

By

Inventor

Frank S. Baldwin

E. W. Anderson & Son his Attorneys

F. S. BALDWIN.
CALCULATING MACHINE.
APPLICATION FILED APR. 20, 1914.
Reissued Dec. 8, 1914.
13,841.
9 SHEETS—SHEET 5.
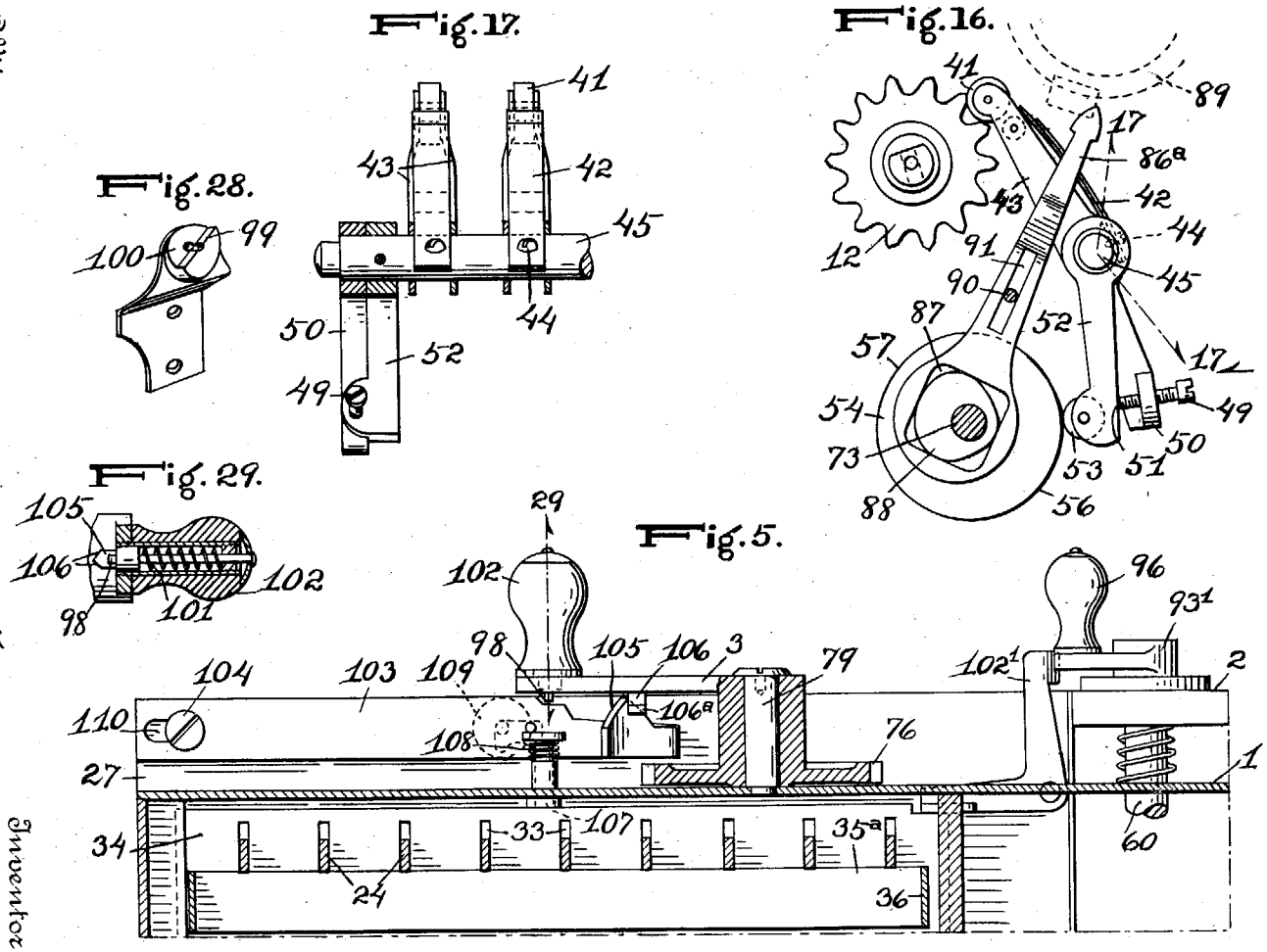
Witnesses
Stuart Hilder.
Frances W. Anderson.
Inventor
Frank S. Baldwin
By E. W. Anderson & Son
His Attorneys F. S. BALDWIN.
CALCULATING MACHINE.
APPLICATION FILED APR. 20, 1914.
Reissued Dec. 8, 1914.
13,841.
9 SHEETS—SHEET 6.
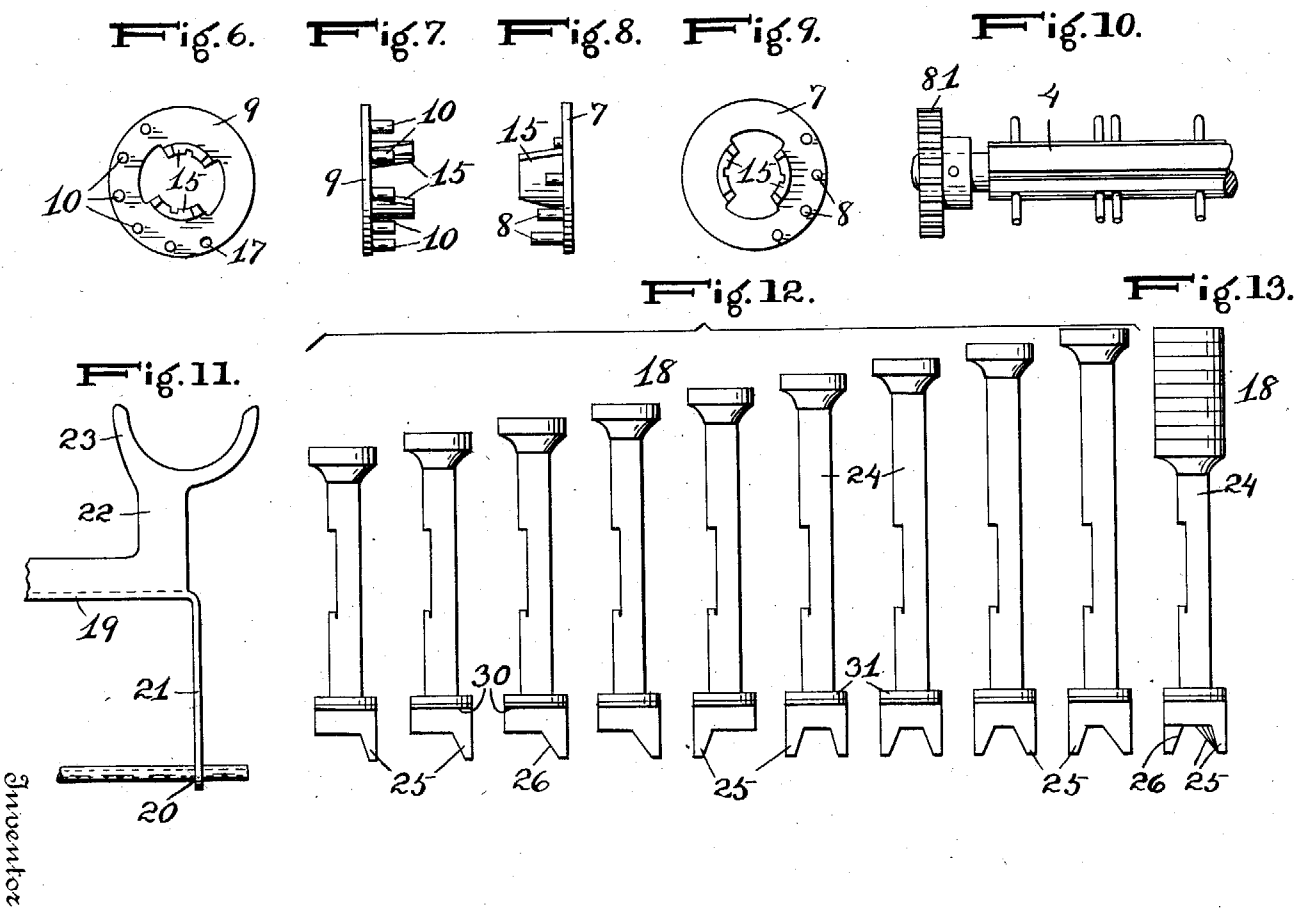
Witnesses
Stuart Hilder.
Franas M. Anderson.
Inventor
Frank S. Baldwin
By
E. W. Anderson & Son
his Attorneys F. S. BALDWIN.
CALCULATING MACHINE.
APPLICATION FILED APR. 20, 1914.
Reissued Dec. 8, 1914.
13,841.
9 SHEETS—SHEET 7.
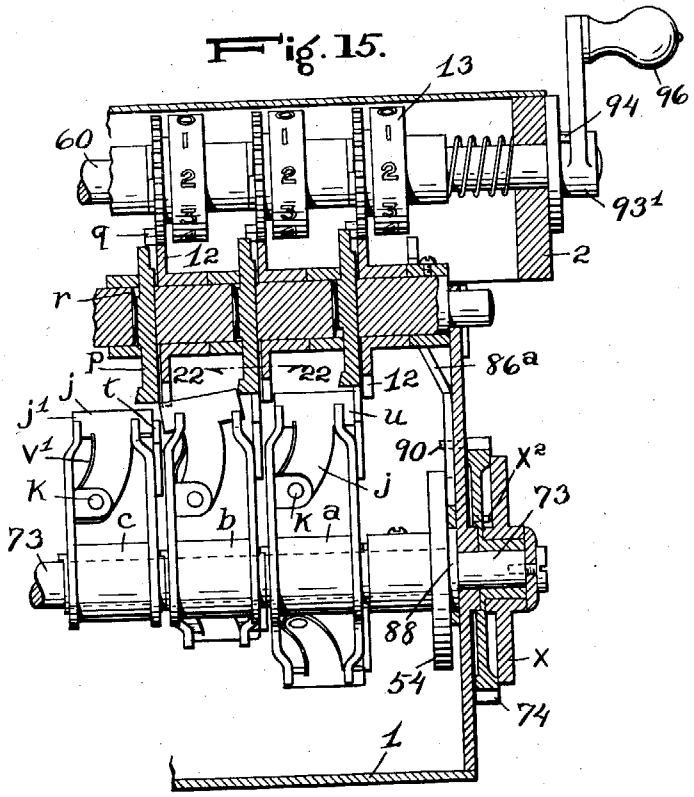
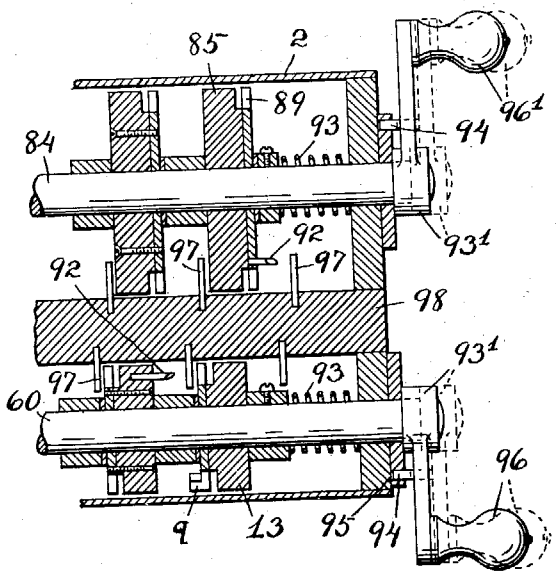
Witnesses
Stuart Hilder.
Franas W Anderson.
Inventor
Frank S. Baldwin
By
E. W. Anderson & Son
his Attorneys F. S. BALDWIN.
CALCULATING MACHINE.
APPLICATION FILED APR. 20, 1914.
Reissued Dec. 8, 1914.
13,841.
9 SHEETS—SHEET 8.
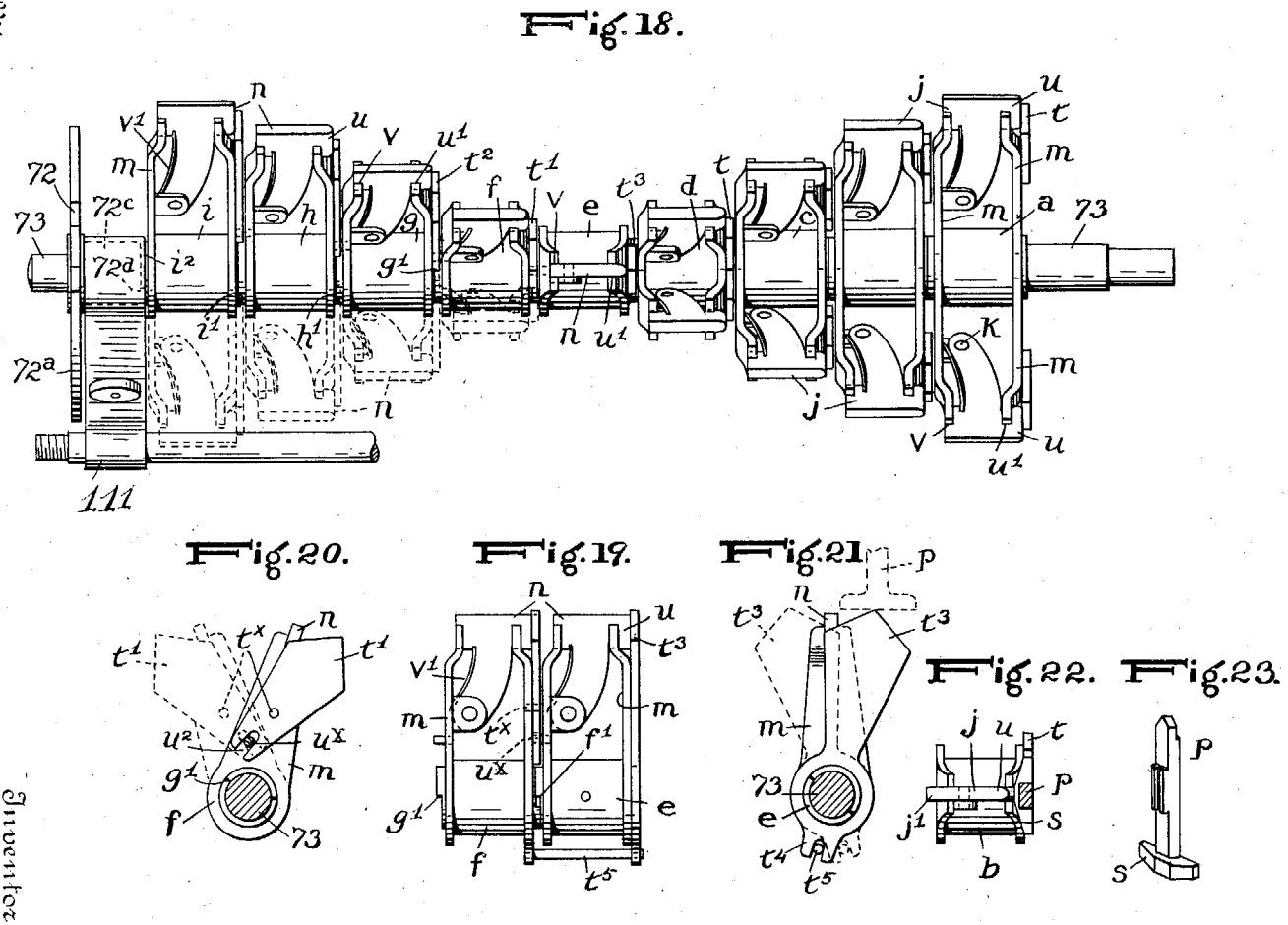
Witnesses
Stuart Hilder.
Frances M. Anderson.
By
Inventor
Frank S. Baldwin
E. W. Anderson & Son
his Attorneys F. S. BALDWIN.
CALCULATING MACHINE.
APPLICATION FILED APR. 20, 1914.
Reissued Dec. 8, 1914.
13,841.
9 SHEETS—SHEET 9.
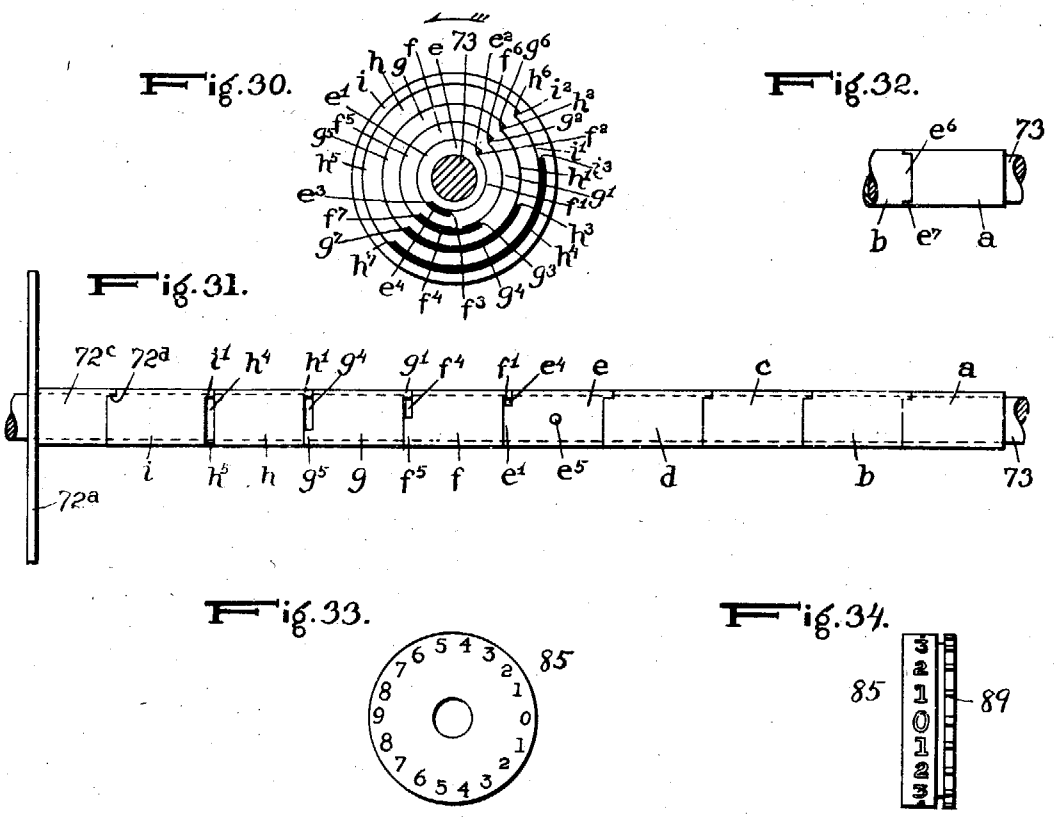
Witnesses
Stuart Hilder.
Frances M. Anderson
By
Inventor
Frank S Baldwin
E. W. Anderson & Son
Lus Attorneys

UNITED STATES PATENT OFFICE.

FRANK S. BALDWIN, OF NEW YORK, N. Y., ASSIGNOR TO MONROE CALCULATING MACHINE COMPANY, A CORPORATION OF NEW YORK.

CALCULATING-MACHINE.

13,841. Specification of Reissued Letters Patent. Reissued Dec. 8, 1914.

Original No. 1,080,245, dated December 2, 1913, Serial No. 703,901. Application for reissue filed April 20, 1914. Serial No. 833,315.

DIVISION A.

*To all whom it may concern:*

Be it known that I, FRANK S. BALDWIN, a citizen of the United States, resident of New York, in the county of New York and State of New York, have made a certain new and useful Invention in Calculating-Machines; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 2:
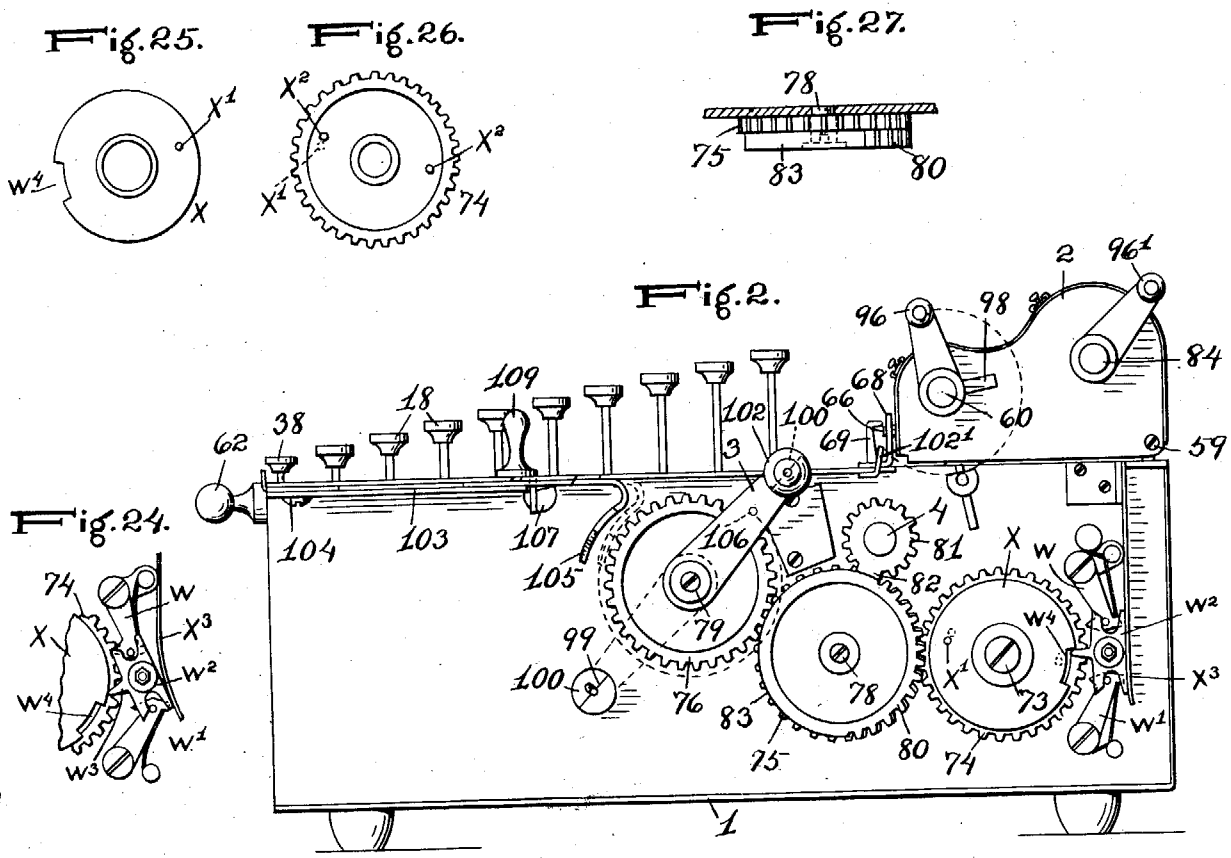
Figure 3:
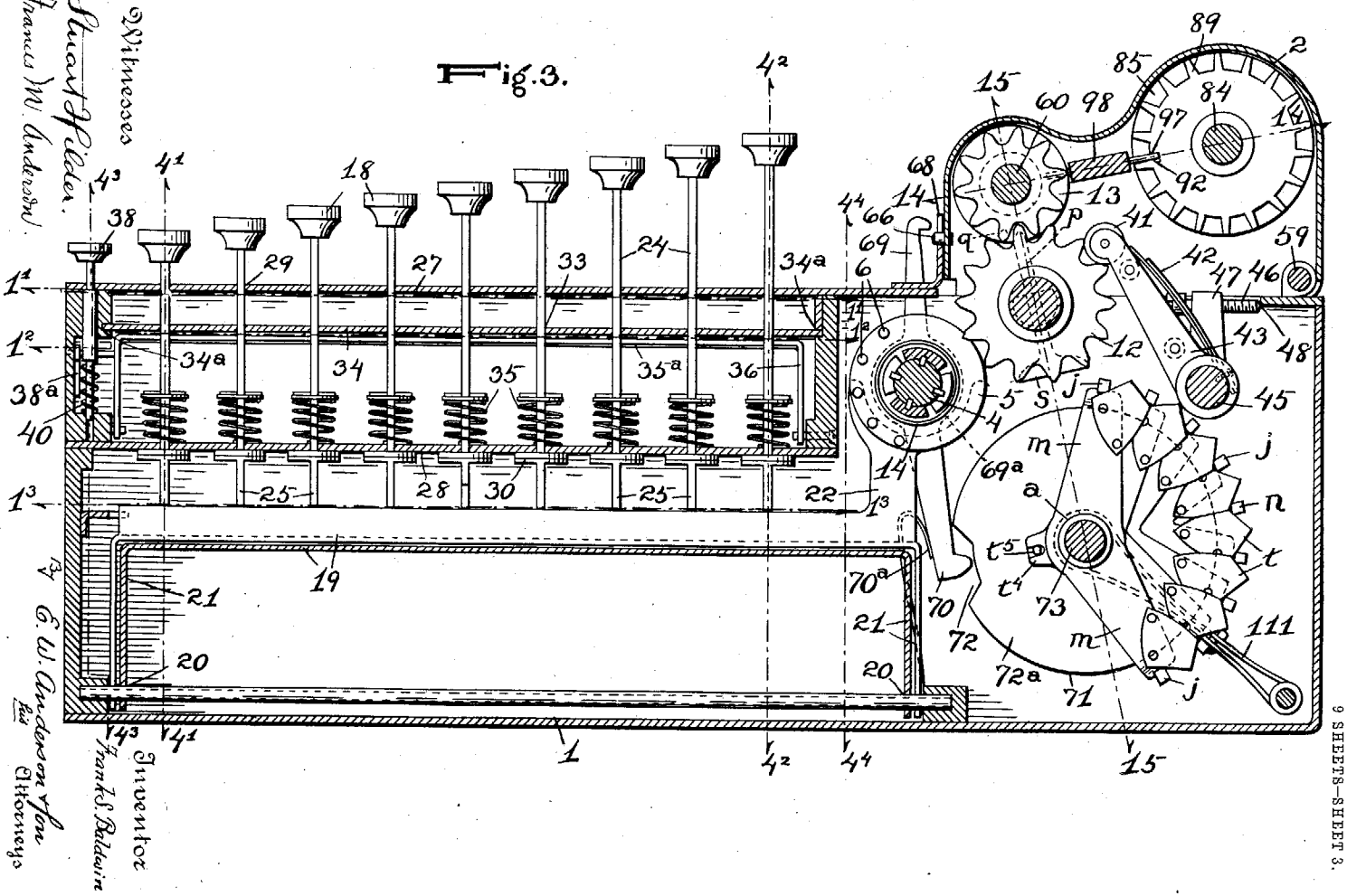
Figure 4:
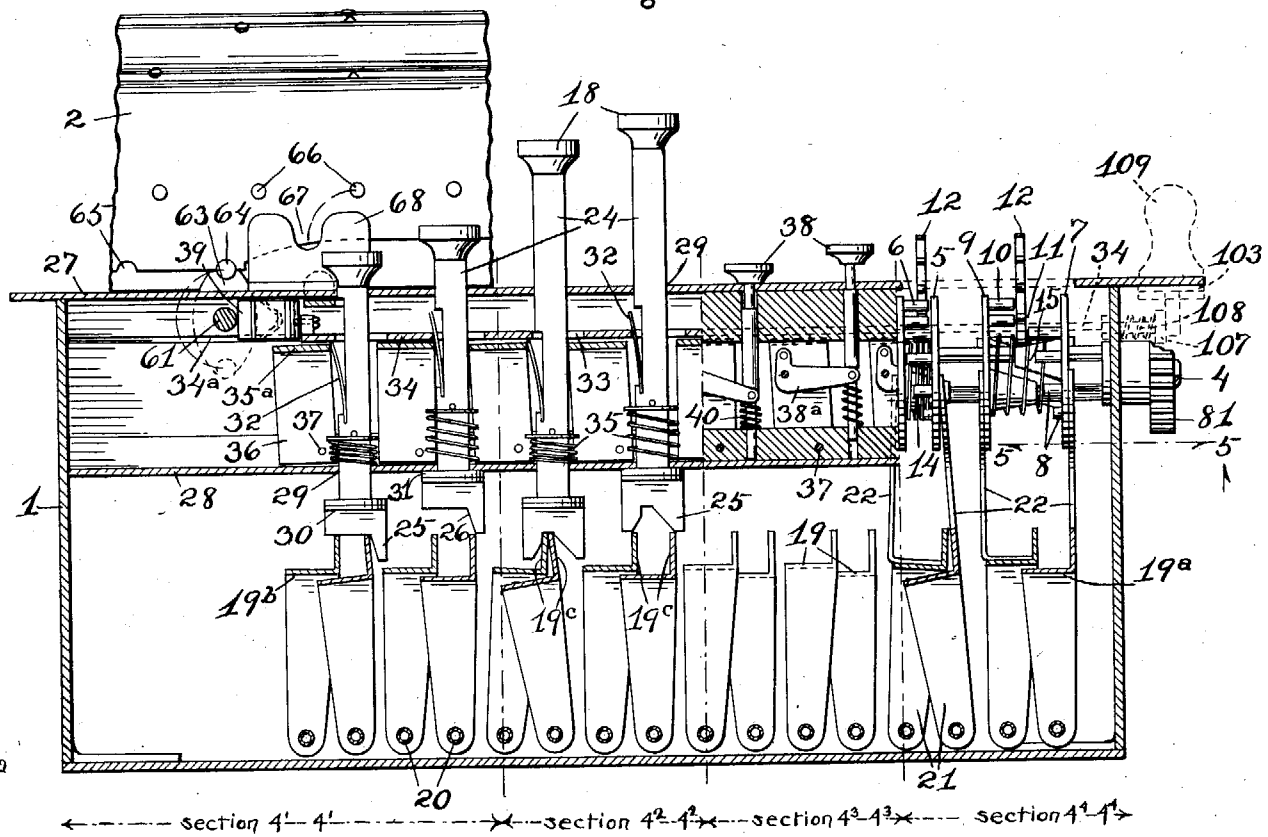

Figure 1 is a plan view of the machine partly in section, the sections being taken on the lines $1^1$—$1^1$, $1^2$—$1^2$, and $1^3$—$1^3$, Fig. 3. Fig. 2 is a side view of the machine. Fig. 3 is a section on the line 3—3, Fig. 1. Fig. 4 is a section on the line $4^1$—$4^1$, $4^2$—$4^2$, $4^3$—$4^3$, Fig. 3, with one numeral key depressed, and one key raised, and a section on the line $4^4$—$4^4$, Fig. 3, with two primary wheel members in normal position and two primary wheel members moved toward each other, parts being omitted. Fig. 5 is a section on the line 5—5, Fig. 4. Fig. 6 is a detail face view of one of the primary wheel members. Fig. 7 is a detail side view of the same. Fig. 8 is a detail side view of the other primary wheel member. Fig. 9 is a detail face view of the same. Fig. 10 is a detail plan view partly broken away, of the primary wheel shaft. Fig. 11 is a detail side view, partly broken away, of one of the rock bars for actuating a primary wheel member. Fig. 12 shows detail front views of the numeral keys. Fig. 13 is a detail front view of all of the numeral keys of one bank or series, one behind the other. Fig. 14 is a section on the line 14—14, Fig. 3. Fig. 15 is a section on the line 15—15, Fig. 3. Fig. 16 is a detail side view of the pawl device for operating the numeral wheels at the rear of the carriage and of the variable tension means for the spring brakes of the intermediate gears, the rectangular path of the operating end of the pawl being shown in dotted lines. Fig. 17 is a section on the line 17—17, Fig. 16. Fig. 18 is a detail front view of the dogs of the carrying mechanism, their collars and shaft, and the spring brake for the hub of the cam upon said shaft, the dogs at one end of the shaft being shown as thrown over to the opposite side in dotted lines. Fig. 19 is a detail plan view of the central collar and dog of the series and the collar and dog next adjacent thereto. Fig. 20 is a detail side view of one of the cam devices for returning a plunger to normal position, the dog with its cam and collar being shown as moved pivotally in dotted lines. Fig. 21 is a detail side view of the cam device for returning the plunger of the central dog of the series to normal position, this cam being shown as moved pivotally in dotted lines. Fig. 22 is a section on the line 22—22, Fig. 15. Fig. 23 is a detail perspective view of one of the plungers. Fig. 24 is a detail side view of the means for preventing reverse movement of the crank handle and its wheel connections. Fig. 25 is a detail side view of the circular plate forming part of said means. Fig. 26 is a detail side view of the gear wheel in rear of said plate. Fig. 27 is a detail plan view of the mutilated gear and the gear in rear of the same. Fig. 28 is a detail perspective view of one of the shouldered posts for engagement with the operating crank handle. Fig. 29 is a section on the line 29—29, Fig. 5. Fig. 30 is a diagrammatic view showing the clutch engagement of the collars of the carrying mechanism. Fig. 31 is a diagrammatic side view of the longitudinal shaft of the carrying mechnaism and the collars thereupon. Fig. 32 is a diagrammatic side view of a portion of this shaft and collars thereupon, partly broken away, showing the interfitting arcuate projections and recesses. Fig. 33 is a diagrammatic view of one of the registering wheels bearing the double series of numbers. Fig. 34 is a side view of one of these wheels and the gear thereof.

The invention has relation to calculating machines, having for its object to provide improved means for the rapid solution of arithmetical problems.

Other objects and advantages will hereinafter appear.

In the accompanying drawings, illustrating the invention, the numeral 1 designates the casing, 2 a movable carriage located above the upper rear part of the casing and wherein the registering mechanism or wheels are located, the keyboard or series of depressible keys being located forwardly of the machine in the usual manner. The operating lever or crank 3 by means of which the registering mechanism is operated is located at the right hand side of the machine.

The registering mechanism will be first described, as follows: A longitudinal rotary shaft 4, provided with suitable bearings in the casing, carries a plurality of primary calculating wheels 5, keyed to the shaft to rotate therewith and capable each of an independent slidable movement upon the shaft. Each wheel 5 consists of two members having pins 6, extending toward each other, the member 7 having four pins 8, of different lengths, and the member 9 having five pins 10, of the same length. The members of each couple are normally in position with the pins thereof separated by an interval 11 wherein the intermediate gears 12 are located, so that a rotation of the primary wheel or wheels does not normally operate the intermediate gear or gears 12. If however, the member 7 is moved laterally a short distance, the longest pin 8 thereof will be moved into operative engagement with the intermediate gear 12, so that a complete rotation of the wheel 5 will move the gear 12 one tooth; if the member 7 is moved farther to one side, the next and shorter pin 8 will be brought into operative engagement with the gear 12, so that a complete rotation of the wheel 5 will rotate the gear 12 two teeth; if the member 7 is moved still farther to one side, the third and still shorter pin 8 will be brought into operative engagement with the gear 12, and a complete rotation of the wheel 5 will turn the gear 12 three teeth; and if the member 7 is moved still farther to one side, the fourth and shortest pin 8 will be brought into operative engagement with the gear 12, and a complete rotation of the wheel 5 will rotate the gear 12 four teeth. If the member 9 is moved upon its shaft to one side in the opposite direction to that in which the member 7 is moved for the purpose stated, all of its five pins 10 will be brought into operative engagement with the gear 12, and a complete rotation of the wheel 5 will turn the gear 12 five teeth; and if the member 9 is moved laterally as stated, and at the same time the member 7 is moved laterally to bring one, two, three or four of its pins into operative engagement with the gear 12, this gear will upon a complete rotation of the wheel 5 be turned six, seven, eight or nine teeth. In this way the primary wheels 5 can be made to turn the intermediate gears 12 from one to nine teeth, these intermediate gears having operative engagement with the numeral wheels 13 of the registering mechanism. Spring means are provided to return the members of each couple of wheels 5 to normal position, consisting preferably of coiled springs 14 surrounding arcuate interfitting hub extensions 15 (Fig. 4) of the wheel members. It is preferred that the longest pin 8 of the member 7 shall engage a perforation 17 of the member 9, in order that the two members may move closer together when in operative engagement with the gear 12.

The key operating mechanism will now be described. The lateral adjustment of the primary calculating wheels 5 is effected by the keys 18. These keys are arranged in any suitable number of parallel series, the members of each series being numbered from one to nine. A primary wheel 5 is provided for each of the series of keys. Located below each series of keys is a set of two rock bars 19 (Fig. 3), the members of each set having a separate pivotal connection 20 with the frame at the lower ends of end arms 21. The members of each set have each an end extension 22 projecting upward and forked at 23 (Fig. 11) to extend between the primary wheels 5, so that upon actuation of a rock bar by operation of one of the keys 18, the primary wheel 5 corresponding to the bar will be laterally adjusted upon the shaft to an extent corresponding to the movement of the rock bar. In order to move the rock bars the varying degrees required for the purpose stated, each key stem 24 is provided with a lower downward projecting cam or beveled lug 25. The beveled or cam surfaces of the lugs are arranged at varying inclinations, to engage the upwardly directed flange $19^c$ and actuate the rock bar to a greater or less distance according to the numeral key depressed, the keys numbered 1, 2, 3 and 4 having each a lug 25 the cam surfaces 26 of which are of increasing inclinations with relation to the horizontal, to actuate one member $19^a$ of the rock bar couple varying distances to one side, to bring one, two, three or four of the pins of the primary wheel member 7 into use; the key numbered 5 has a single lug 25 at the opposite side of its stem and arranged to actuate the other member $19^b$ of the rock bar toward its mate, to bring the five pins of the primary wheel member 9 into use; and the keys numbered 6, 7, 8 and 9 have each a double or divided lug 25 arranged to actuate both members of the rock bar toward each other, the member $19^b$ being moved to bring the five pins of the wheel member 9 into use, and the member $19^a$ being simultaneously moved to bring one, two, three or four of the pins of the wheel member 7 into use.

The top of the keyboard is preferably provided with upper and lower plates 27 and 28 (Fig. 4), spaced apart and provided with perforations 29 engaged by the stems of the keys, said stems having at their lower ends, above the lugs, shoulders 30, carry-buffers 31 in contact with the lower plate to limit the upward movement of the keys. As each key is depressed a laterally extending spring 32 of the stem is carried through the perforation 33 of an intermediate universal erasing plate 34, and springs outward under said erasing plate to hold the key in depressed position and thereby to hold the rock bars as moved to one side and the primary calculating wheels as set up or adjusted for the number of the key depressed. After the keys are depressed and the registering mechanism operated as stated hereinafter, the depressed keys of all the series may be restored to normal position by moving the erasing plate to one side, by means hereinafter referred to. This erasing plate is carried in guideways 34ᵃ of the frame, to provide for an accurate horizontal position and movement thereof, and the slots or perforations 33 are somewhat longer than the width of the stems of the keys, so that when the plate is adjusted or slid as stated the opening will be moved from over the end of the spring and the spring and key allowed to rise under the influence of coil springs 35 surrounding the key stems.

An individual erasing means or rock bar 35ᵃ is provided for each series or bank of keys, and has engagement with the springs 32 to press the same toward the key stems, said bar being carried by upward extending arms 36, pivoted to the frame at 37 and actuated by depressible keys 38, through the medium of levers 38ᵃ one key for each series or bank of the numeral keys. A spring means 39 is provided to return the universal erasing plate to normal position, and a spring means 40 to return the individual erasing means to normal position.

The intermediate gears 12 are provided each with a spring-pressed roller brake 41 (Fig. 3), the springs 42 of the roller arms 43 being secured at one end at 44 (Fig. 17) in a stationary manner to the shaft 45, upon which said arms are pivoted. A tension device is provided for the springs, consisting of a screw 46 (Fig. 3) having threaded engagement with a crank arm 47 of the shaft 45, said screw bearing at one end against the frame at 48, whereby, upon adjustment of the screw, the shaft 45 will be rocked to vary the tension of the springs 42 against the arms 43. In case a variable and adjustable tension device is preferred, the screw 46 is adjusted to render it of no effect, and the following employed instead:

A screw 49 (Fig. 16) has threaded engagement with the end of a crank arm 50 fast upon the shaft 45, said screw having at its end a bearing at 51 against the end of a loose arm 52, also upon said shaft 45, said arm 52 having a roller bearing 53 against a cam 54 carried by a shaft 73, to be hereinafter described. In this way, as the shaft 73 rotates, the portion 56 of the cam in contact with the roller 53 will, through the medium of the screw 49, cause the shaft 45 and the springs carried thereby to be thrown to press the springs against the roller arms 43 to a greater extent than when the portion 57 of the cam is in engagement with the roller 53, said portion 57 being arranged to lessen the tension of the springs against the arms 43 at the time that the intermediate gears are moved by the primary calculating wheels, said primary wheels being moved by means hereinafter described. The variable tension may be adjusted by adjustment of the screw 49.

The carriage mechanism will now be described. A shiftable carriage 2 is pivoted and movable upon a longitudinal shaft 59 (Fig. 3) at the upper rear portion of the frame. Located forwardly within said carriage are a series of numeral wheels 13 (Fig. 15), upon which is registered the calculation, through the medium of the carrying mechanism hereinafter described, said wheels being each loosely mounted upon a longitudinal shaft 60 of the carriage. This carriage is provided with means whereby it may be moved longitudinally when it is desired to carry out the calculation to a greater number of figures than there are series or banks of keys, this means consisting of a rotary shaft 61 (Fig. 1) provided forwardly of the casing with an operating handle 62 and at its rear end with a double crank arm 63 (Fig. 4), pins 64 being located at the end of the arms 63 and having engagement with one of a longitudinal series of notches 65 at the lower forward edge of the carriage casing. Upon operation of the crank handle the pin will lift the carriage and throw it one space, when the opposite pin will come in engagement with the next notch and throw the carriage another space. The carriage is provided above the series of notches thereof with a longitudinal series of forward projecting pins 66, two of which when the carriage is in lowered or normal position rest in open-top seats or notches 67 of upward projections or lugs 68 of the casing or frame of the machine. As the carriage is raised upon its pivot shaft and shifted space by space, the pins will be lifted with the carriage from said seats and the next pins in line will come into engagement with the seats to limit the downward movement of the carriage. The carriage is, during the operation of the mechanism to register the calculation upon the numeral wheels 13, locked in depressed position by means of an upward-extending hook arm 69 (Fig. 3), the hub 69ᵃ as shown in dotted lines Fig. 3 of which is loose upon the primary wheel shaft, the upper hook end of said arm being located over one of the pins 66. When the calculation is completed, and the shaft 73 is rotated completely, a downward extending hook arm 70 upon the hub 69[a] will be caused by its spring 70[a] to engage a notch 72 of a cam 72[a] and move the upward extending hook arm from engagement with said pin to release the carriage, which may now be shifted. The hook arm 70 has engagement with said notch, at the start and at the finish of the calculation, and throughout the calculation between start and finish has engagement with the circumferential surface 71 of the cam for the purpose stated.

The carrying mechanism between the numeral wheels of the registering mechanism is described as follows: A longitudinal shaft 73, mounted in journal bearings in the frame or casing is provided at one end with a gear wheel 74 in mesh with a gear 75, having the same number of teeth and being in turn in mesh with a gear 76, having also the same number of teeth and which is rotated by an operating crank handle 3. The gears 75 and 76 turn upon lateral studs 78 and 79 of the frame, and the gear 75 is provided in front thereof with a mutilated gear 80, of the same diameter but a few more than half of the teeth of which are removed at one side of the gear, this gear having its teeth in mesh with a smaller gear 81 on the primary wheel shaft 4, so that a half-rotation of the gears 75 and 80, brought about by a half-turn of the crank handle and of the gear 76, will turn the gear 81 and the shaft 4 completely around. The shaft 4 is turned completely around during the first half-turn of the crank handle, and during the last half-turn of this handle and of the gears the shaft 4 is held stationary by means of a double tooth 82 of its gear, said tooth having an arcuate concave outer surface in engagement with the cylindrical surface 83 of the mutilated gear. Carried by the shaft 73 are a plurality of collars *a*, *b*, *c*, *d*, *e*, *f*, *g*, *h* and *i*; the first four collars *a*, *b*, *c* and *d* being provided each with two pivoted carrying dogs *j*, said dogs being pivoted at *k* to radial arms *m* of the collars; whereas the balance of the collars are provided each with a single carrying dog *n*. The collars *a* to *e* inclusive are fixed upon the shaft, the collar *e*, having a pin connection $e^5$, with the shaft, and the collars *a*, to *e*, inclusive having arcuate interfitting lateral projections and similarly formed recesses *e*, *e*. The distance between the dogs carried by the collars *d*, *c*, *b* and *a* increase, and beginning with the collar *e*, which is the central collar of the series, the dogs on the collars *d*, *c*, *b* and *a* are arranged in spiral lines about one-fourth around the shaft in two directions, the dogs forming one spiral acting to carry when the shaft 73 is rotated in one direction, as for instance for addition or multiplication, and when revolved in the opposite direction the dogs of the other spiral will act in an inverse way, as for subtraction or division.

The collars *f* to *i* inclusive are capable of an independent oscillating movement upon the shaft 73, the collars carrying these dogs having interfitting shoulders or projections, the oscillating movement of these collars *f* to *i* inclusive causing the dogs thereof to arrange themselves in a spiral line about one-fourth around the shaft 73 when the shaft is turned in one direction and in an opposite or intersecting spiral line when the shaft is rotated in the opposite direction. In this way, when the shaft 73 is rotated in one direction the dogs of the oscillatory collars will arrange themselves in a spiral line in continuation of the spiral arrangement of one set of dogs of the collars *a* to *d* inclusive, thus forming a spiral line of dogs about one-half around the shaft 73 when said shaft is rotated in one direction; but when said shaft is rotated in the opposite direction the dogs of the loose collars will arrange themselves in a spiral line in continuation of the other set of dogs carried by the collars *a* to *d* inclusive, and thus form an oppositely pitched spiral of dogs about one-half around the shaft 73. It will also be noted that the dog of the central collar *e* is at the center of and in line with either of these spiral arrangements, and that when the shaft 73 is rotated in one direction the dogs will act in succession in one spiral for the carrying operation from one end of the shaft to the other, and when the shaft is rotated in the opposite direction the dogs will operate in succession in an oppositely pitched spiral. The intermediate gears 12 are loosely journaled upon their shaft, and between the gears project longitudinally movable plungers *p*, these plungers being carried by the shaft of the intermediate gears. The upper end of each plunger is beveled as shown in Fig. 23 for engagement with a lateral extension *q* of one of the teeth of each numeral wheel 13. Each plunger is provided with a spring brake *r*, so that it will be retained in position as moved.

The operation of the carrying devices is as follows: The shaft 4 is rotated once completely, as previously explained, the carrying shaft 73 rotating also once completely, and as the lateral tooth extension *q* of any one of the gears 13 is caused to engage with the upper beveled end of the plunger *p* below the same, the plunger is forced down to the lower limit of its movement, a cam head *s* of the plunger being at the same time depressed in position to, in the rotation of the shaft 73, engage and throw the dog $j$ immediately below the plunger so that the opposite end $j^1$ of the dog will project in position to engage and turn the next intermediate gear 12, and also the next numeral wheel 13, one tooth only, at the end of which time the plunger will be caused to resume its normal position by a cam $t$ upon the radial dog-carrying arm. Each collar has two laterally opposite radial arms $m$, the dog being pivoted at its inner end at $k$ to one of these arms and having an outer end extension $u$ which is normally seated in a recess or notch $u^1$ of the other arm, projecting beyond said recess so that it may be engaged by the cam head of the plunger. The opposite side or end of the dog is normally seated in a recess $v$ at the outer end of the radial arm at this side. Spring means $v^1$ are provided to return each pawl to normal position after it is released. The pawls operate in planes at right angles to the radial arms upon which they are pivoted. The cam head of each plunger is beveled at opposite ends thereof, so that it will operate and throw the dog in either direction of rotation.

The cam $t$ upon each of the collars $a$ to $d$ inclusive is double, to return the plunger to normal position in either direction of rotation. And in order that the cams of the dogs $f$ to $i$ inclusive may operate to return the plungers corresponding thereto to normal position in either position of these dogs as oscillated with their carrying arms to one side or the other, these cams $t^1$ are pivoted to their carrying arms at $t^x$ (Fig. 20), and as each collar is moved in turn by the interfitting hubs, first the cam $t^1$ of the collar $f$ is caused to turn upon its pivot by engagement of a pin $u^1$ of the collar $e$ with a slot $u^2$ of the cam; and as the next collar $g$ is caused to move by the interfitting hubs, its cam $t^2$ is caused to turn pivotally in the same manner, and so on to the end of the line. The cam $t^3$ of the middle collar $e$ also requires to be thrown to operate in either position of the collars and their dogs, and is pivoted upon the shaft 73, being provided with a slotted extension $t^4$ at the opposite side of the shaft, the slot of said extension being engaged by a pin $t^5$ of the collar $f$, to throw the cam when required. The carrying dogs are arranged wholly upon one side of the axis of the shaft 73, upon the side corresponding to the non-toothed portion of the gear 80, so that the shaft 4 is caused to have a complete rotation and to cause the required movement of the registering mechanism, and is at rest during the time that the carrying mechanism is being operated.

A means is provided to prevent reverse movement of the operating handle and of the gear wheels until the complete rotation of the handle and of the gears in either direction is completed, consisting preferably of oppositely extending spring-pressed pawls $w$, $w^1$ (Fig. 24), an intermediate pivoted member $w^2$ operating to normally hold both of said pawls from engagement with the teeth of the gear 74, said member having an inward projection $w^3$, normally in engagement with a notch $w^4$ of a circular plate $x$ located at the outside of the gear 74 and upon the same shaft, said plate having an inward projecting pin $x^1$, with which either of diametrically opposite pins $x^2$ of the gear 74 have engagement, to turn said plate a complete rotation upon a complete turn of the gear 74, but allowing the gear 74 to turn one-half backward without actuation of said plate. As the plate is turned the beveled end of the notch thereof will turn the member $w^2$ upon its pivot, to throw one of the pawls into engagement with the gear 74, the projection $w^3$ riding upon the outer circumferential smooth surface of the plate to cause said pawl to remain in engagement with said gear, and at the end of the complete turn falling back into the notch, under the influence of a spring $x^3$, and throwing the pawl out of engagement with the gear. Within the rear portion of the carriage are located, upon a longitudinal shaft 84, a series of numeral wheels 85, numbered from one to nine in a double reverse series, sight openings 86 in the carriage being intended to expose the number upon said wheels indicating the quotient in division and the multiplier in multiplication. The wheels 85 are operated individually from the shaft 73, so that each rotation of the shaft 73 will turn the wheel 85 to be operated one tooth, this being accomplished by means of a pawl 86$^a$, having an operating connection with said shaft, preferably by means of a rectangular slot 87 in the end of the pawl, said slot or opening being engaged by a cam 88 upon the shaft 73, whereby the movement of the pawl will be first directly toward the gear 89, fast upon the wheel 85 to be turned, one gear 89 being provided for each said wheel; the movement of the operating end of the pawl being next in a straight line at right angles to its first movement, to throw the gear 89, a pin 90 having movement in a slot 91 of the pawl and serving as a guide; the movement of the pawl being next directly away from the gear 89 in a straight line, and the fourth and final movement of the pawl, completing the cycle, being in a straight line back to normal position, completing the rectangle of its movement. In this way it is designed to simplify the action of the pawl and to prevent any jamming in its engagement with the gear.

A means is provided to return the numeral wheels 13 and the wheels 85 of the carriage to normal position, as follows: The wheels 13 and 85 are provided with laterally extending pins 92, which in the rotation of the wheels are normally allowed to turn freely. The shafts 84 and 60 which carry these wheels are movable endwise in their bearings at the end of the carriage, against the tension of springs 93 which return the shafts when released to normal position. Each shaft is provided with an end collar $93^1$ having an inward projecting pin 94, which in the normal position of the shaft is seated in a recess 95 of the end of the carriage, to hold the shaft against rotation, but when either shaft is moved endwise, by taking hold of the crank handle 96 or $96^1$, it may be held out against the tension of the spring 93 and the shaft turned by said handle to turn the numeral wheels 13 or 85. As these wheels are turned the pins 92 thereof will, in the endwise-moved shaft position, have engagement with extensions 97 of a longitudinal bar 98 located between the two sets of wheels and stationary in the carriage, to turn the wheels back to zero, the said extensions operating through said pins upon each wheel individually. The wheels 13 and 85 have a comparatively tight fit upon their shafts, so that they will turn through friction when the shafts are turned, while being capable of being turned separately with relation to the shafts, when the shafts are held stationary. In performing addition and multiplication (which is repeated addition), the operating handle 3 is in the position shown in Fig. 2 of the drawings, and a complete turn of the handle is made in a clockwise direction. In substraction and in division (which is repeated substraction) the operating handle is located in the position shown in dotted lines, Fig. 2, being turned first one-half reverse clockwise from the first named starting position, after which, to perform the calculation, the handle is turned one complete rotation in a reverse clockwise direction. During this half turn which the handle must make to starting position for these two calculations, the gear 81 and the shaft 4 will remain stationary, as also the primary calculating wheels; and during this half turn also the plate $x$ will remain stationary, for reasons previously stated.

In order to provide a positive indication that the handle and the wheels in operative connection therewith are at starting position for the performance of the calculation, a stop means is provided for the handle when it arrives at either starting position, consisting preferably of a spring-pressed pin 98 (Fig. 29) carried by the handle and having engagement with a shoulder 99 (Fig. 28) of a post 100 of the casing, said pin being lifted outward against the tension of its spring 101 by means of the handle knob 102, the handle being then moved past the shoulder and the pin allowed to move back to normal position, where it will stop the handle at the completion of the turn. Two posts 100 are provided, one diametrically opposite to the other, and the shoulder 99 is provided upon each post. As the numeral wheels 13 are returned to zero by operation of the crank handle 96, at the end of the movement, this handle is designed to automatically operate the universal erasing plate, to return all of the depressed keys of all the series to normal position, preferably through the medium of a bell crank lever $102^1$ with which said handle contacts, the other arm of said lever having engagement with the erasing plate.

A means is provided for the automatic operation of the universal erasing plate at the end of the movement or complete turn of the crank handle 3 in either direction, consisting preferably of a lever 103 (Fig. 5) pivoted at one end thereof at 104, the opposite end of said lever being provided with a beveled portion 105 with which a beveled inward projecting pin 106 of the handle 3 has engagement to throw the lever, said lever having operating engagement with the erasing plate through the medium of a pin 107, said pin being moved against the tension of its spring 108, whereby when the handle pin has passed over and from engagement with said lever, the pin will be returned to normal position, at the same time returning the lever 103 to normal position. The beveled portion 105 of the lever is provided in duplicate, the bevel of the two parts being opposite, so that the lever is operated at the end of the rotation of the crank handle in either direction, the pin 106 of the handle being oppositely beveled at $106^a$ for the same purpose. The lever 103 may be thrown endwise, so that it will not be operated by the crank handle, by means of an operating knob 109, a slot 110 being provided in the lever end for engagement with its pivot, to allow this movement. This knob 109 may be used to throw the lever 103 to move the erasing plate at any time desired. It is preferred to provide a spring brake 111 for the hub $72^c$ (Fig. 18) of the cam $72^a$, said hub having a clutch connection $72^d$ with the end collar $i$, being an interfitting arcuate lateral projection and a similarly formed recess. The collar $e$, being the last collar of the series $a$, to $e$, fixed to and rotating with the shaft 73, is provided with a laterally projecting arcuate portion $e^1$, terminating at its ends in shoulders $e^2$, $e^3$. The next collar $f$, being the first collar of the series $f$ to $i$, movable upon the shaft 73, is provided with a laterally projecting arcuate portion $f^1$, terminating at its ends in shoulders $f^2$, $f^3$, of which shoulder $f^2$, is normally in contact with shoulder $e^2$, the other shoulder $f^3$, being separated from the shoulder $e^3$, by an interval $f^4$, said collar $f$, having upon the opposite side thereof a second arcuate laterally projecting portion $f^5$, terminating at its ends in shoulders $f^6$, $f^7$. The next collar $g$, is provided with a laterally projecting arcuate portion $g^1$, terminating at its ends in shoulders $g^2$, $g^3$, of which one shoulder $g^2$, is normally in contact with shoulder $f^6$, the other shoulder $g^3$, being separated from the shoulder $f^7$, by an interval $g^4$, of greater extent than the interval $f^4$, this collar $g$, having at its opposite side a second arcuate laterally projecting portion $g^5$, terminating at its ends in shoulders $g^6$, $g^7$. The next collar $h$, is provided with a laterally projecting arcuate portion $h^1$, terminating at its ends in shoulders $h^2$, $h^3$, of which one shoulder $h^2$, is normally in contact with shoulder $g^6$, and the other shoulder $h^3$, is separated from the shoulder $g^7$, by an interval $h^4$, of greater extent than the interval $g^4$, said collar $h$, having at its opposite side a second arcuate laterally projecting portion $h^5$, terminating at its ends in shoulders $h^6$, $h^7$. The last collar $i$, is provided with a laterally projecting arcuate portion $i^1$, terminating at its ends in shoulders $i^2$, $i^3$, of which one shoulder $i^2$, is normally in contact with shoulder $h^6$, the other shoulder $i^3$, being separated from the shoulder $h^7$, by an interval $i^4$, of greater extent than the interval $h^4$. The shaft 73, is turned in the direction of the arrow, Fig. 30, to cause the collar $e$, to move with the shaft and close up the interval $e^4$, separating the shoulders $e^3$, $f^3$, these shoulders then having contact to rotate the collar $f$, with the collar $e$; the collar $f$, in its movement with the shaft closing up the interval $f^4$, separating the shoulders $f^7$, $g^3$, when these shoulders will have contact to rotate the collar $g$, with the collar $f$; the collar $g$, in its movement with the shaft closing up the interval $g^4$, separating the shoulders $g^7$, $h^3$, these shoulders then having contact to rotate the collar $h$, with the collar $g$; the collar $h$, in its movement with the shaft closing up the interval $h^4$, separating the shoulders $h^7$, $i^3$, these shoulders then having contact to turn the collar $i$, with the collar $h$. Movement of the collars with the shaft will cause the collars $f$, to $i$, inclusive, to be arranged in a spiral line about one-fourth around the shaft 73 when this shaft is turned in one direction, and in an opposite or intersecting spiral when the shaft is turned in the opposite direction. In the operation of the crank to return the numeral wheels 13 to zero it is necessary that the carriage be lifted, in order that the wheels 13 may be cleared from engagement with the intermediate gears 12.

What I claim is:

1. A calculating machine, comprising a registering mechanism including primary actuating wheels constructed each of independently movable members capable of movement in opposite directions toward common central points for certain numbers in series, and means for moving said wheels in opposite directions for the purpose specified.

2. A calculating machine, comprising a registering mechanism including primary actuating wheels constructed one member of each wheel to be moved in one direction for certain succeeding numbers, the other member of each wheel to be moved in the opposite direction for the next succeeding number, and both members of each wheel to be moved toward each other for certain other succeeding numbers, the movement of the members being toward common central points, and means for moving the members of the wheels as stated for the purpose specified.

3. A calculating machine, comprising a registering mechanism including primary actuating wheels constructed one member of each wheel to be moved in one direction for numbers one to four inclusive, the other member of each wheel to be moved in the opposite direction for the number five, and both members of each wheel to be moved toward each other for numbers six to nine inclusive, the movement of the members being toward common central points, and means for moving the members of the wheels as stated for the purpose specified.

4. A calculating machine, comprising a registering mechanism including a plurality of numeral wheels, a primary rotatable and laterally movable calculating wheel composed of two members arranged at opposite sides of a central space, a wheel intermediate a numeral wheel and primary calculating wheel adapted to mesh with said members, means for holding said members in normal position, and means for independently or conjointly moving the primary wheel members laterally to bring one or more teeth of said members in line with the intermediate wheels, and means adapted to rotate the primary wheels for the purpose stated.

5. A calculating machine, comprising a registering mechanism including a plurality of numeral wheels, primary rotatable calculating wheels each composed of two members having pins and capable of independent or conjoint slidable movement in opposite directions and arranged at opposite sides of a central space, intermediate wheels adapted to mesh each with the pins of either or both said members, means for holding said members in normal position, means for independently or conjointly moving the members to bring one or more pins thereof in line with the intermediate wheels, and means for rotating the primary wheels for the purpose described.

6. A calculating machine, comprising a registering mechanism including a plurality of numeral wheels, a primary rotatable and laterally movable calculating wheel for each numeral wheel, an intermediate wheel adapted to mesh with both the primary and the numeral wheels, said primary wheels being each composed of two members one of which has a plurality of pins of different lengths and the other of which has a plurality of pins of the same length, means for holding the primary wheels in normal position with the teeth of said members out of engagement with the intermediate wheels, means for moving the members of the primary wheels laterally to bring one or more teeth thereof in line with the intermediate wheels, and means for rotating the primary wheels.

7. A calculating machine, comprising a registering mechanism including a plurality of numeral wheels, an intermediate wheel for each numeral wheel, a rotatable and laterally movable primary wheel for each intermediate wheel, the primary wheels being each composed of two members having pins of different lengths arranged at opposite sides of a central space, a laterally movable bar having an operative engagement with each of said members, a plurality of keys having engagement with the bars to move the same different distances and said members corresponding distances, and means for rotating the primary wheels.

8. A calculating machine, comprising a plurality of numeral wheels, an intermediate wheel for each numeral wheel, a rotatable and laterally movable primary wheel for each intermediate wheel, the primary wheels being each composed of two members having pins of different lengths arranged at opposite sides of a central space, a horizontally arranged laterally swinging bar having operative engagement with each of said members to move it laterally, a plurality of keys adapted to move the bars different distances and said members corresponding distances, and means for rotating the primary wheels.

9. A calculating machine, comprising a registering mechanism including a plurality of numeral wheels, an intermediate wheel for each numeral wheel, a primary calculating wheel for each intermediate wheel, said primary wheel being composed of two members having pins of different lengths arranged on opposite sides of a central space, an elongated laterally swinging bar having an operative engagement with each of said members to move it laterally, a plurality of keys having stems provided with cam beveled ends engaging the bars to move them different distances and said members corresponding distances, and means for rotating the primary wheels.

10. A calculating machine, comprising a plurality of numeral wheels, an intermediate wheel for each numeral wheel, a primary calculating wheel for each intermediate wheel, said primary wheel being composed of two members having pins of different lengths arranged on opposite sides of a central space, an elongated laterally movable bar for each of said members having operative engagement therewith to move it laterally, a plurality of keys having stems provided with cam beveled ends of varying angular relation engaging the bars to move them laterally different distances and said members corresponding distances, and means for rotating the primary wheels.

11. A calculating machine, comprising a registering mechanism including a primary calculating wheel composed of two members, a laterally movable elongated bar having operative engagement with each of said members to move it to a set up position, a plurality of keys having stems adapted to move the bars laterally when the keys are depressed, means for holding and releasing the keys at and from their depressed position, and means for rotating the primary wheels while the keys are held in depressed position.

12. A calculating machine, comprising a registering mechanism including a primary calculating wheel composed of two independently movable members capable of movement in opposite directions toward common central points for certain numbers in series, a laterally movable elongated bar having operative engagement with each of said members to move it laterally to a set up position, a plurality of keys having stems adapted to move the bars laterally different distances and said members corresponding distances when the keys are depressed, means for holding the keys in depressed position and for holding said members in set up position, means for releasing the keys and for returning them to normal position, means for returning said members and said bars to normal position, and means for rotating the primary wheels while the keys are held in depressed position and said members are held in set up position.

13. A calculating machine, comprising a registering mechanism including a plurality of numeral wheels, a plurality of intermediate wheels adapted to mesh therewith, a shaft carrying a plurality of primary calculating wheels, means for setting up said primary wheels, a second shaft provided with a carrying mechanism for the intermediate wheels, an operating means having a crank handle, gear connections between said operating means and the first named shaft and between said means and said second shaft for turning the first named shaft and the primary wheels during the first half revolution of said handle and for turning said second shaft and the carrying mechanism, said carrying mechanism having operative engagement with said intermediate wheels when the primary wheels are at rest, means for holding the primary wheels and their shaft stationary when at rest, and means for preventing reverse movement of said handle and said gear connections until the complete revolution of said handle is effected.

14. A carrying mechanism for calculating machines, comprising a shaft, a plurality of independently movable intermediate gear wheels thereupon, a second shaft, a plurality of numeral wheels upon said second shaft having gears in mesh with said intermediate wheels, and carrying devices comprising an endwise movable plunger for each intermediate wheel seated in the first named shaft, a third shaft parallel to the first named shaft, pivoted carrying dogs upon said third shaft adapted to be engaged by said plunger in the rotation of the first named shaft and to be thrown into engagement with the succeeding intermediate wheel to cause said wheel to rotate one tooth, the numeral wheels being provided with means for depressing said plunger once during each rotation thereof.

15. A carrying mechanism for calculating machines, comprising a shaft, a plurality of independently movable intermediate gear wheels thereupon, a second shaft, a plurality of numeral wheels upon said second shaft having gears in mesh with said intermediate wheels, and carrying devices, comprising an endwise movable plunger for each intermediate wheel seated in the first named shaft, a third shaft parallel to the first named shaft, pivoted carrying dogs upon the third shaft one of which is adapted to be engaged by said plunger in the rotation of the first named shaft and thrown into engagement with the succeeding intermediate wheel to rotate the same one tooth, the numeral wheels being provided with means for depressing said plunger once during each rotation thereof, cam means carried by said third shaft for returning the plunger to normal position, and spring means for returning the carrying dogs to normal position.

16. A carrying mechanism for calculating machines, comprising a shaft, a plurality of independently movable intermediate gear wheels upon said shaft, a second shaft, a plurality of independently movable numeral wheels upon said second shaft having gears in mesh with said intermediate wheels, and carrying devices comprising an endwise movable plunger for each intermediate wheel seated in the first named shaft between the intermediate wheels, one end of said plunger having a cam beveled head and the other end of the plunger being beveled, a third shaft parallel to the first named shaft, pivoted dogs carried by said third shaft, one of said dogs being adapted to be engaged by said cam head in the rotation of the first named shaft and thrown into engagement with the next succeeding intermediate wheel to rotate the same one tooth, the numeral wheel gears having each a lateral projection of one of their teeth adapted to engage the upper beveled end of said plunger and move it endwise once during each rotation of the first named shaft into the line of travel of the dog.

17. A carrying mechanism for calculating machines, comprising a shaft, a plurality of independently movable intermediate gear wheels thereupon, a second shaft, a plurality of numeral wheels upon said second shaft having gears in mesh with said intermediate wheels, and carrying devices comprising an endwise movable plunger for each intermediate wheel seated in the first named shaft, a third shaft parallel to the first named shaft, pivoted carrying dogs upon said third shaft, one of said dogs being adapted to be engaged by said plunger in the rotation of the first named shaft and thrown into engagement with the next succeeding intermediate wheel to rotate the same one tooth, the numeral wheels being provided with means for depressing said plunger once during each rotation thereof, a fourth shaft, a series of independently movable numeral wheels thereupon, and means for turning the last named wheels one tooth for each rotation of said third shaft comprising a pawl having means of operative connection with said third shaft to cause the pawl to move in straight lines at right angles to each other.

18. In a calculating machine, the combination with setting-up mechanism including primary wheels, carrying mechanism, an operating device for turning said wheels and said carrying mechanism, a series of intermediate wheels operated by said primary wheels when set up, and an endwise-shiftable pivoted carriage having a series of registering wheels engaging said intermediate wheels, of means for holding the carriage down during the rotation of said operating device and for releasing the carriage at the finish of the rotation thereof.

19. In a calculating machine, the combination with setting-up mechanism including primary wheels, carrying mechanism, an operating device for turning said wheels and said carrying mechanism, a series of intermediate wheels operated by said primary wheels when set up, and an endwise-shiftable pivoted carriage having a series of registering wheels engaging said intermediate wheels, of means including a rotary cam and a pivoted device having an upper end intermittently engaging and releasing the carriage and a lower end engaging said cam, for holding the carriage down during the rotation of said operating device and for releasing the carriage at the finish of the rotation thereof.

20. In a calculating machine, the combination with setting-up mechanism including primary wheels, carrying mechanism, an operating device for turning said wheels and said carrying mechanism, a series of intermediate wheels operated by said primary wheels when set up, and an endwise-shiftable pivoted carriage having a series of registering wheels engaging said intermediate wheels, of means including pins of the carriage, a rotary cam and a pivoted device having an upper hook end intermittently engaging and releasing said pins and a lower end engaging said cam, for holding the carriage down during the rotation of said operating device and for releasing the carriage at the finish of the rotation thereof.

In testimony whereof I affix my signature, in the presence of two witnesses.

FRANK S. BALDWIN.

Witnesses:
ANSELM P. ANDERSON,
FRANKLIN S. WAGNER.